US010113563B2

(12) United States Patent
Scheidl et al.

(10) Patent No.: US 10,113,563 B2
(45) Date of Patent: Oct. 30, 2018

(54) HYDRAULIC DRIVE AND METHOD FOR DISCREETLY CHANGING THE POSITIONAL OUTPUT OF SAID DRIVE

(71) Applicant: LINZ CENTER OF MECHATRONICS GMBH, Linz (AT)

(72) Inventors: Rudolf Scheidl, Plaika (AT); Andreas Ploeckinger, Gunskirchen (AT); Christoph Gradl, Pregarten (AT)

(73) Assignee: Linz Center of Mechatronics GmbH, Linz (AT)

(*) Notice: Subject to any disclaimer, the term of this patent is extended or adjusted under 35 U.S.C. 154(b) by 244 days.

(21) Appl. No.: 15/027,444

(22) PCT Filed: Oct. 7, 2014

(86) PCT No.: PCT/EP2014/071479
§ 371 (c)(1),
(2) Date: Apr. 6, 2016

(87) PCT Pub. No.: WO2015/052206
PCT Pub. Date: Apr. 16, 2015

(65) Prior Publication Data

US 2016/0252106 A1 Sep. 1, 2016

(30) Foreign Application Priority Data

Oct. 7, 2013 (EP) .................................... 13187579

(51) Int. Cl.
*F16D 31/02* (2006.01)
*F15B 11/13* (2006.01)

(52) U.S. Cl.
CPC ..... *F15B 11/13* (2013.01); *F15B 2211/30565* (2013.01); *F15B 2211/30575* (2013.01);
(Continued)

(58) Field of Classification Search
CPC ................................ F15B 1/045; F15B 11/13
See application file for complete search history.

(56) References Cited

U.S. PATENT DOCUMENTS 7,237,472 B2 * 7/2007 Cove ...................... F15B 11/13 60/473
2004/0187490 A1 9/2004 Cunningham

FOREIGN PATENT DOCUMENTS

DE 2 057 639 A 6/1971
DE 100 00 901 A1 7/2001
(Continued)

OTHER PUBLICATIONS

International Search Report of PCT/EP2014/071479, dated Feb. 6, 2015.

*Primary Examiner* — Michael Leslie
(74) *Attorney, Agent, or Firm* — Collard & Roe, P.C.

(57) ABSTRACT

A hydraulic drive carries out a method for discretely changing a positional output on the hydraulic drive. At least one displacement cylinder incrementally supplies or discharges the cylinder volume to or from the drive by displacing the cylinder piston element from a starting to an end position depending on at least one input signal. The piston element is repeatedly displaced from starting to end position and back to discretely change the positional output correspondingly to the supplied or discharged displacement volume. The cylinder is hydraulically connected to a pressure medium source supply or return line while displacing the piston element from starting to end position. The changed positional output is restored in a successive step. The cylinder chambers of the displacement cylinder are hydraulically short-circuited by a short-circuit line hydraulically separated from the supply or return line when returning the piston element from the end to the starting position.

19 Claims, 6 Drawing Sheets

(52) U.S. Cl.
CPC .................. *F15B 2211/405* (2013.01); *F15B 2211/41527* (2013.01); *F15B 2211/455* (2013.01); *F15B 2211/46* (2013.01); *F15B 2211/7052* (2013.01); *F15B 2211/7656* (2013.01)

(56) References Cited

FOREIGN PATENT DOCUMENTS

| | | | |
|---|---|---|---|
| DE | 10 2008 046 562 | A1 | 3/2010 |
| GB | 2 410 963 | A | 8/2005 |

* cited by examiner

HYDRAULIC DRIVE AND METHOD FOR DISCREETLY CHANGING THE POSITIONAL OUTPUT OF SAID DRIVE

CROSS REFERENCE TO RELATED APPLICATIONS

This application is the National Stage of PCT/EP2014/071479 filed on Oct. 7, 2014, which claims priority under 35 U.S.C. § 119 of European Application No. 13187579.1 filed on Oct. 7, 2013, the disclosure of which is incorporated by reference. The international application under PCT article 21(2) was not published in English.

TECHNICAL FIELD

The invention relates to a hydraulic drive and to a method for discrete changing of a position output, particularly of its path output and/or angle output, on a hydraulic drive, in which method at least one displacer cylinder incrementally either supplies to or discharges from the drive its displacer volume, as a function of at least one input signal, by means of relocation of its piston element from a starting position into an end position, in that the piston element of the displacer cylinder is relocated multiple times from the starting position into the end position and from this end position back again, in order to discretely change the position output on the drive in accordance with the displacer volume supplied or discharged, wherein during relocation of the piston element from the starting position into the end position, the displacer cylinder is hydraulically connected with a feed line or return line of a pressure medium source, and in a subsequent step, the changed position output on the drive is reset again.

STATE OF THE ART

Digital hydraulic actuating drives, in which a drive cylinder is supplied with displacer volume by multiple parallel and possibly also dual-step displacer cylinders, in order to deliver a path output at the position output of the actuating drive, are known from the state of the art (DE2057639A). It is disadvantageous that a comparatively great number of displacer cylinders is required for such actuating drives, particularly if high resolutions are demanded at the path output, which increases the design effort and thereby the costs for such actuating drives. Furthermore, the likelihood of a failure can increase due to the great number of displacer cylinders, and this in turn impairs the stability of the actuating drives.

A state of the art according to the preamble of the independent claims is known from GB2410963A.

Presentation of the Invention

The invention has set itself the task of changing a method for discrete changing of a position output, of the type described initially, in such a manner that a position output can be produced quickly but nevertheless at high resolution. Furthermore, the method is supposed to be possible on a cost-advantageous hydraulic drive.

The invention accomplishes the stated task, with regard to the method, in that when the piston element is relocated from the end position into the starting position, the cylinder chambers of the displacer cylinder are hydraulically short-circuited by way of a short-circuit line that is hydraulically separated from the feed line or return line of the pressure medium source.

A fast method can be obtained if the cylinder chambers of the displacer cylinder are hydraulically short-circuited by way of a short-circuit line that is hydraulically separated from the feed line or return line of the pressure medium source, during relocation of the piston element from the end position into the starting position of the cylinder chambers of the displacer cylinder, in order to thereby ensure direct pressure equalization between the two cylinder chambers. In addition, in contrast to the state of the art, the cylinder chambers have the hydraulic pressure of the working space of the working cylinders applied to them—and are thereby prepared for a faster switching process for supplying or discharging displacer volume; this can be conducive to the reaction time and therefore the quickness of the method. In spite of a high resolution at the position output, a particularly fast method can therefore be made possible. Furthermore, this can also improve the robustness of the method, in that a reduced number of parts need to be activated, in order to be able to relocate the piston element. Furthermore, this can open up the possibility of using a cost-advantageous hydraulic drive to carry out the method according to the invention.

In general, it should be mentioned that a hydraulic drive can be understood to be a pressure sensor, pump, linear drive, actuating drive or the like, which can produce a linear and/or rotational movement at its position output, in order to thereby deliver a path output and/or angle output.

The successive approach to a desired path output can be improved if a first displacer cylinder is used for incrementally supplying displacer volume and a second displacer cylinder is used for incrementally discharging displacer volume. Furthermore, the maximal sampling rate of the hydraulic drive in the conversion of an input signal to a path output can be increased by means of two displacer cylinders that are disposed in parallel and act hydraulically in opposite directions.

The design conditions can be further simplified if one of the displacer cylinders resets the changed position output on the drive by means of incrementally supplying or discharging displacer volume.

Alternatively or also in addition to the above, a shutoff valve can be opened during resetting of the changed position output on the drive, which valve discharges from or supplies to the drive its incrementally supplied or discharged displacer volume. Such a shutoff valve can furthermore also accelerate the resetting of the drive and thereby increase the reaction speed of the method.

The design conditions at the drive can be further simplified if the displacer cylinder is hydraulically connected with the feed line and/or return line of a pressure medium source during relocation of the piston element. This connection can furthermore be used not only for supplying and discharging hydraulic fluid to and from the displacer cylinder, when its piston element is relocated from the starting position into the end position—instead, it is also possible to use it for equalization of the pressure conditions of the piston chambers, in order to allow resetting of the piston element from the end position into the starting position.

If the displacer cylinder is hydraulically connected with the feed line and/or return line of the pressure medium source, by way of a directional control valve, the design effort for controlling the displacer cylinder can be reduced, thereby also reducing the costs of the drive, among other things.

Advantageous method conditions can occur if a directional control valve changes from a first into a second working position as a function of the input signal, in order to hydraulically connect the feed line and/or return line of the pressure medium source connected with the directional control valve with the displacer cylinder.

In order to undertake resetting of the piston element from its end position into the starting position in controlled manner, it can be provided that the piston element of the displacer cylinder is relocated back into the starting position from the end position when the first working position of the directional control valve is assumed.

Short-circuiting of the cylinder chambers can be brought about in reproducible manner if the cylinder chambers of the displacer cylinder are short-circuited by way of the directional control valve in the first working position.

If the piston element is relocated back into its starting position by means of a spring element, not only can the design effort relating to the drive be reduced, but also the energy efficiency of the hydraulic drive can be increased by means of eliminating active elements.

Simple conditions in the handling of the position output can occur if displacer volume is supplied to or discharged from a working cylinder of the drive, in order to discretely change the position output on the drive by way of the movement of its piston element.

If the hydraulic pressure in the drive cylinder is measured and used for error correction with regard to the discretely changed position output on the drive, the precision at the position output can be further increased. Thus, for example, the errors on the basis of compressibility can be determined and evened out by referring to known compressibility laws of the pressure fluid. The central pressure in the piston space of the drive cylinder can particularly be used for this purpose. This is true for this reason, because particularly when relocating the piston element back, almost the same hydraulic pressure prevails at all the hydraulically short-circuited cylinder chambers (drive cylinders and related displacer cylinders).

What has been said above can furthermore be used for a comparatively robust method, if at least one input signal is changed as a function of the measured hydraulic pressure, in order to correct errors between the reference value and the actual value at the discretely changed position output. This can take place, for example, using known control methods or regulation methods.

It is furthermore the task of the invention, proceeding from the state of the art as described, to create a hydraulic drive that is simple in terms of design, and reliable, and furthermore can quickly provide a precise position output.

The invention accomplishes the stated task with regard to the hydraulic drive in that the device for relocating the piston element back has a short-circuit line between the cylinder chambers of the displacer cylinder, which short-circuit line is hydraulically separated from the pressure medium source during relocation back of the piston element.

If the device for relocating the piston element back has a short-circuit line between the cylinder chambers of the displacer cylinder, which short-circuit line is hydraulically separated from the pressure medium source during relocation back of the piston element, simplified design conditions for relocation back of the piston element can occur—and this can be conducive to the stability of the hydraulic drive. Furthermore, the same hydraulic pressure that also prevails in the working cylinder can be ensured in the short-circuited cylinder chambers, and this can reduce the reaction ability of the hydraulic drive, among other things, and thereby allow a fast hydraulic drive.

Particularly robust relocation back of the piston element can be guaranteed if the device for relocating the piston element back has a spring element that engages on the piston element. In this way, increased stability of the hydraulic drive can be ensured, among other things.

The discrete relocation of the position output can be accomplished, with a simple design, if the short-circuit line is hydraulically connected with the displacer cylinder by way of the directional control valve, in its first working position, wherein the displacer cylinder is hydraulically connected with the pressure medium source in a second working position of the directional control valve. A 3/2 directional control valve can be particularly suitable for this purpose.

It is alternatively conceivable that the device for relocating the piston element back has a directional control valve, which, jointly with the directional control valve that is connected with the pressure medium source, is hydraulically connected with the displacer cylinder.

The design conditions can be further simplified if the reset device has a shutoff valve or a displacer cylinder.

Particularly energy-saving operation of the displacer cylinder according to the invention can be made possible, if the hydraulic drive has a kickback valve that hydraulically blocks the cylinder chamber, which is hydraulically connected with the pressure medium source during relocation of the piston element from the starting position into the end position, toward the return line of the pressure medium source, and is hydraulically open toward the feed line of the pressure medium source. In this way, the pulse of the cylinder piston can be used to reach the end position in this regard, even if the connection with the pressure medium source for relocation of the piston element is prematurely severed.

In order to limit the functionality of the short-circuit line on the relocation back of the piston element, the short-circuit line can have a directional control valve or a kickback valve.

BRIEF DESCRIPTION OF THE DRAWING

In the figures, the method according to the invention is shown in greater detail, using multiple embodiment variants as examples. The figures show.

WAYS TO IMPLEMENT THE INVENTION

Figure 1:
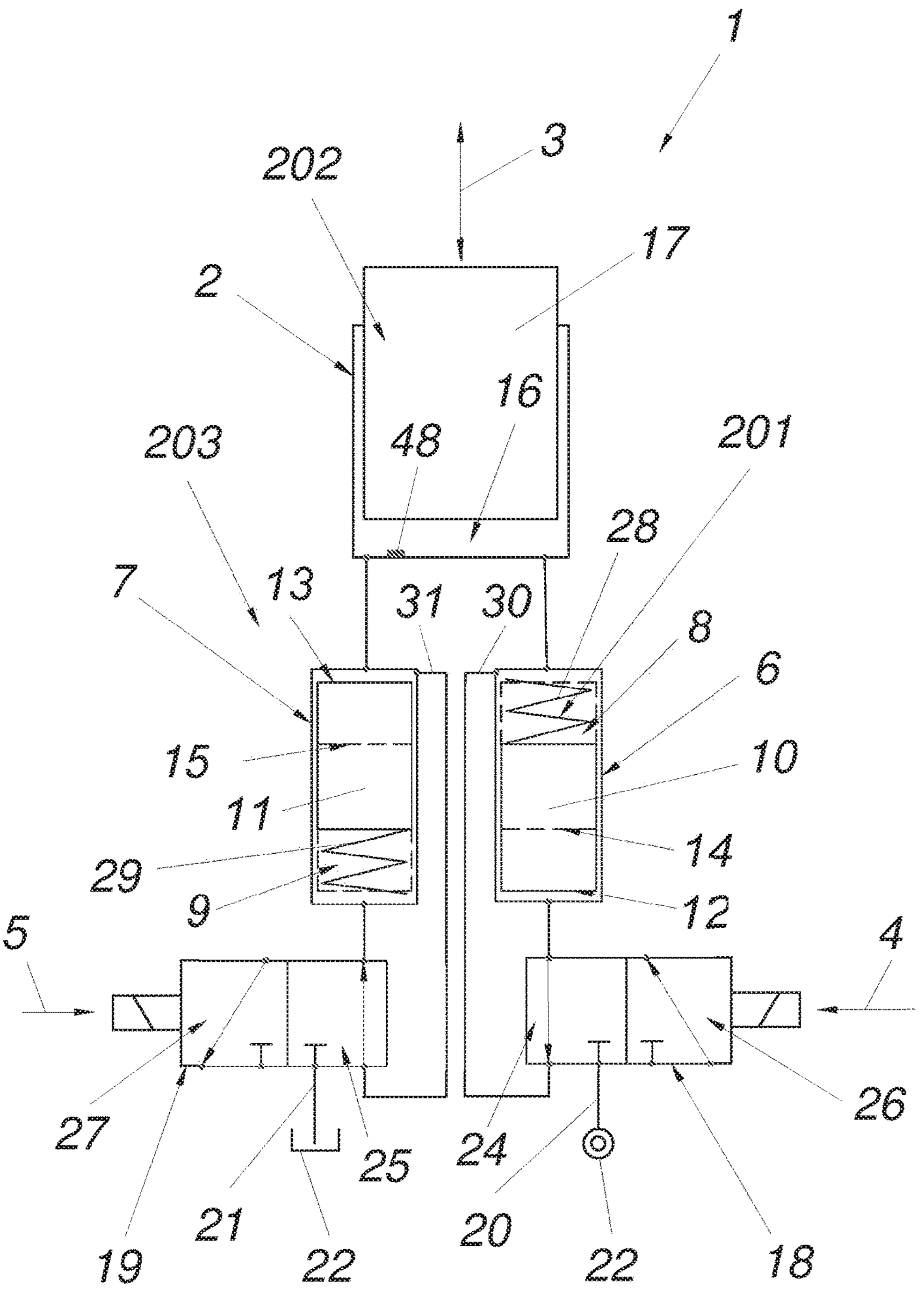
FIG. 1 a schematic view of a hydraulic drive according to a first exemplary embodiment, and FIG. 2 a circuit schematic of the method sequence, using the hydraulic drive shown according to FIG. 1*i,*

According to the hydraulic drive 1 shown in a schematic view according to FIG. 1, this drive delivers or produces a changed position output 3 in the form of a linear path output at its drive means 202 or drive cylinder 2, which output demonstrates a dependence on two digital input signals 4, 5, in that these coded input signals 4, 5 are converted to a discrete position output 3. Specifically, a displacer cylinder 6, 7, in each instance, is controlled with these two digital input signals 4, 5, which cylinder either supplies its displacer volume 8, 9 to or discharges it from the drive cylinder 2 of the drive 1*i*, by means of relocation of the piston element 10, 11 from a starting position 12, 13 into an end position 14, 15—the latter is shown with a broken line in FIG. 1.

The piston elements 10, 11 are structured as pistons, in terms of design. In general, piston rods, for example known from plunger cylinders or the like, are also conceivable as piston elements.

Because the chamber volume 16 of the drive cylinder 2 is increased or reduced as a result, the position output 3 at the drive cylinder 2 is also changed in accordance with the displacer volume 8 or 9 that is supplied or discharged, respectively. In order to nevertheless achieve high resolution at the position output 3 of the drive cylinder 2 with a displacer cylinder 6 or 7, displacer volume 8, 9 is incrementally supplied to or discharged from the drive cylinder 2 with this displacer cylinder 6 or 7. For this purpose, the respective piston element 10 or 11 of the displacer cylinder 6 or 7 is relocated from the starting position into the end position 12, 14 or 13, 15, respectively, and back again multiple times.

Figure 2:
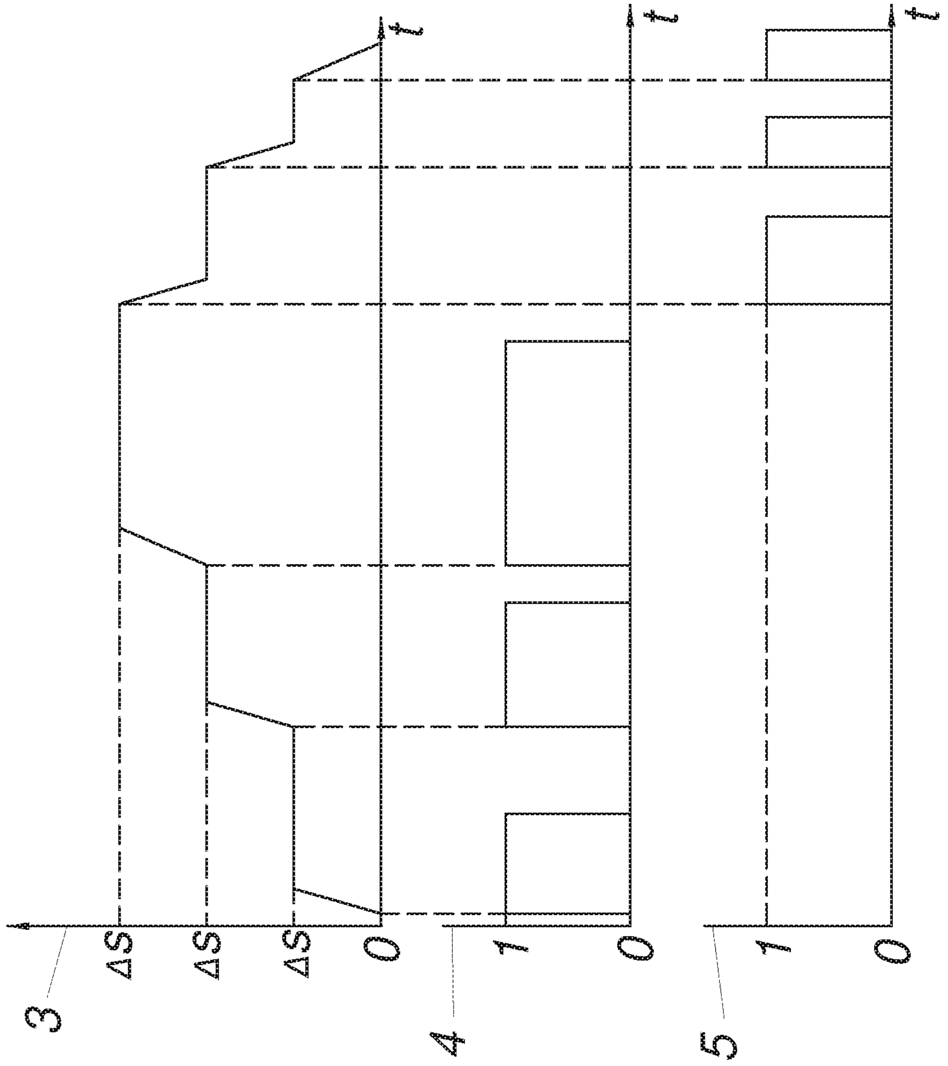

In FIG. 1, two displacer cylinder 6 and 7 are shown. The first displacer cylinder 6, however, exclusively serves for incrementally supplying its displacer volume 8 to the drive cylinder 2, whereas the second displacer cylinder 7 exclusively serves for incrementally discharging its displacer volume 9 from the drive cylinder 2, as will be explained in greater detail below, using FIG. 2. Thus, the circuit schematic of the first displacer cylinder 6 can be seen in the middle part of FIG. 2, which cylinder is switched as a function of the input signal 4, which alternates between zero and one. The switching process between zero and one brings about relocation of the piston element 10 of the displacer cylinder 6 from the starting position into the end position 12, 14. The hydraulic fluid that is additionally pushed into the drive cylinder 2 increases the chamber volume 16 of the drive cylinder 2, so that the piston element 17 of the drive cylinder 2 is relocated or goes outward by Δs—proceeding, for example, from its zero position—as can be seen in the uppermost circuit schematic of FIG. 2. In comparison with this, the circuit schematic of the second displacer cylinder 7 is situated underneath this circuit schematic of the first displacer cylinder 6. This displacer cylinder 7 is also switched as a function of an input signal 5 that alternates between zero and one, and accordingly leads to an inward movement of the piston element 15 of the drive cylinder 2 by Δs. Furthermore, it can be seen according to FIG. 2 that a displacer cylinder 6 incrementally supplies three times its displacer volume 8 to the drive cylinder 2, leading to a central peak in the position output 3. The displacer cylinder 7 is used for the method step of resetting the changed position output 3 at the drive 1, and forms the reset device 203 in this connection.

Control of the displacer cylinder 6, 7 is taken on by a 3/2 directional control valve 18, 19, in each instance, of which the directional control valve 18 is connected with the feed line 20, and the directional control valve 19 is connected with the return line 21 of a pressure medium source 22. In accordance with the input signal 4, the feed line 20 of the pressure medium source 22 is connected with the displacer cylinder 6 by way of the directional control valve 18, and thereby the pump pressure $p_s$ is applied to the piston element 10 to relocate it into its end position 14, and pushes its displacer volume 8 into the working cylinder 2. For this purpose, the directional control valve 18 assumes the second working position 26 of the two working positions 24, 26. Accordingly, the tank pressure $p_t$ is applied to the displacer cylinder 7 when the directional control valve 19 is switched, and this causes its piston element 11 to also move into the end position 15 and to convey displacer volume 9 to the tank of the pressure medium source 22. With regard to FIG. 1, it should be pointed out that here, the first working position 24, 25 is shown for both directional control valves 18, 19. For the supply and discharge of displacer volume 8 and 9, respectively, as described above, however, the second working position 26 or 27 or the directional control valve 18 or 19 should be activated.

In the first working position 24 or 25 of the directional control valve 18 or 19, the respective piston element 10 or 11 of the displacer cylinder 6 or 7 is relocated back from the end position 14 or 15 into its starting position 12 or 13. For this purpose, a device 201 or spring element 28, 29 is provided, which moves the respective piston element 10, 11 back.

Figure 3:
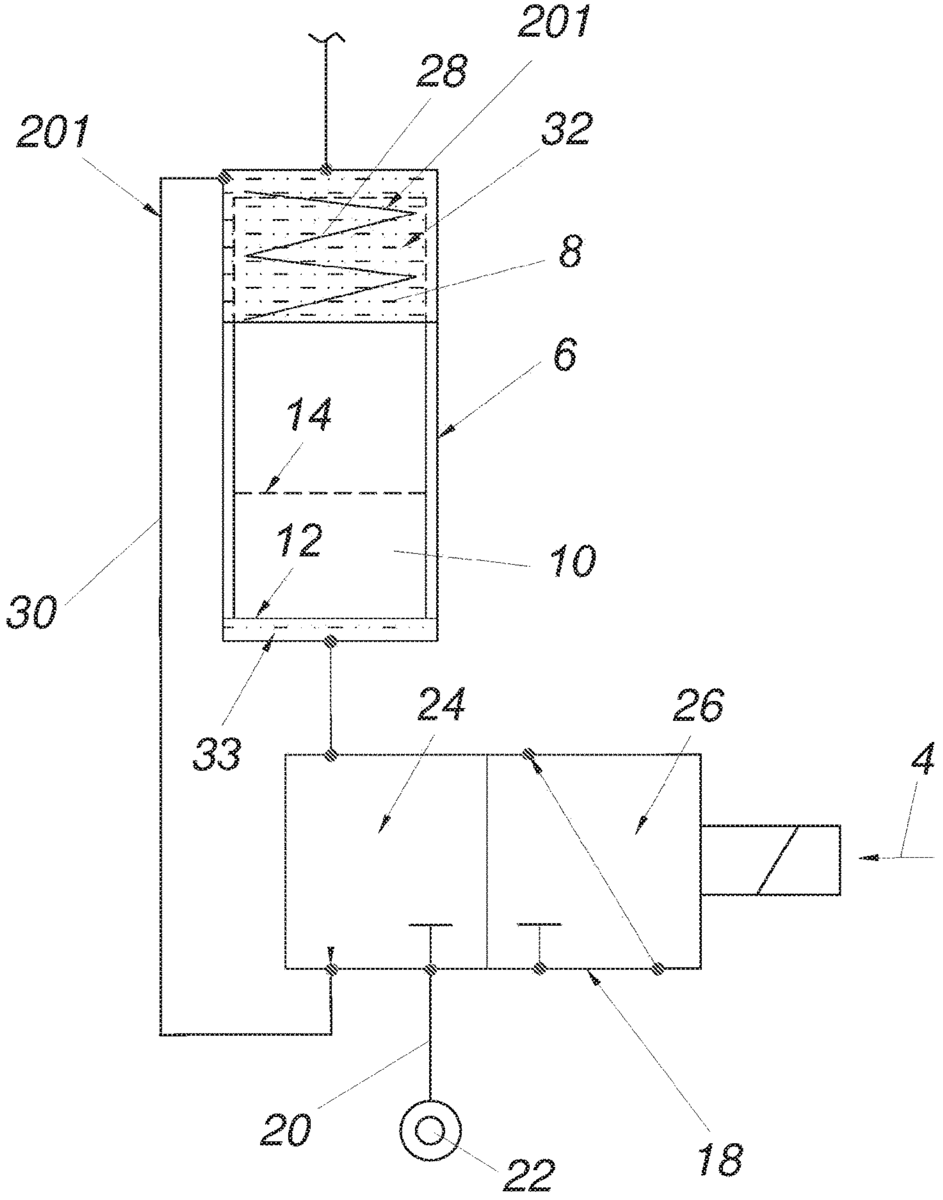
FIG. 3 an enlarged schematic partial view of FIG. 1 regarding the switching arrangement of a displacer cylinder for supplying displacer volume, FIGS. 4 and 5 further switching arrangements as alternatives to FIG. 3, FIG. 6 a switching arrangement as an alternative to FIG. 1, regarding a displacer cylinder for discharging displacer volume, and FIG. 7 a schematic view of a hydraulic drive according to a further exemplary embodiment.

Furthermore—as shown in FIG. 3 relating to the displacer cylinder 6—the cylinder chambers 32, 33, which are situated on the two sides of the piston element 10, are hydraulically short-circuited when the piston element 10 is relocated back—specifically by way of a short-circuit line 30. This short-circuit line 30 is opened in the first working position 24 by way of the directional control valve 18, thereby allowing hydraulic fluid to flow from the one cylinder chamber 33 into the other cylinder chamber 32. This can significantly facilitate the resetting the piston element 10 into its starting position 12. Short-circuiting of the cylinder chambers of the displacer cylinder 7 takes place in similar manner to the displacer cylinder 8, by way of a short-circuit line 31, which is opened by the directional control valve 19 in the first working position 25. As a result, the piston element 11 of the displacer cylinder 8 can be set back into the starting position 13.

Figure 4:
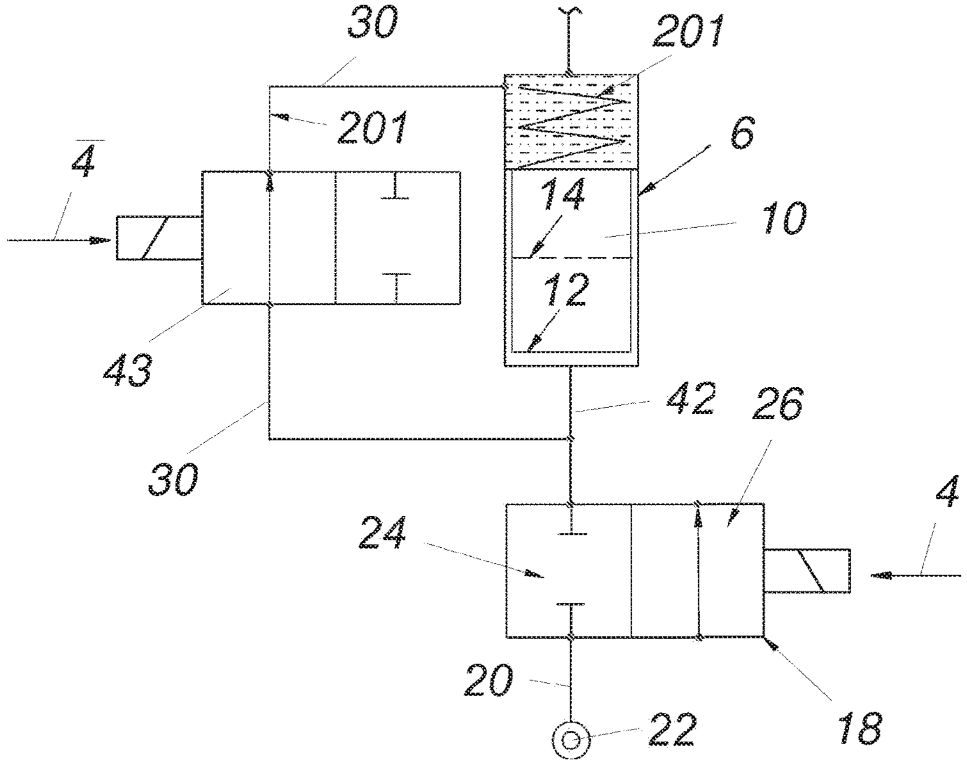

The circuit schematic relating to the displacer cylinder 6 shown according to FIG. 4 allows operation, particularly operation minimized with regard to leakage losses, of the displacer cylinder 6. For this purpose, in comparison with FIG. 3, a 3/2 directional control valve is avoided, and a 2/2 directional control valve 18 is used, in order to hydraulically connect the pressure medium source 22 with the displacer cylinder 6. The short-circuit line 30 empties into this connection 42. In this short-circuit line 30, there is a further 2/2 directional control valve 43, which is controlled with an inverse control signal 4, in order to reset the displacer cylinder 6 back into its starting position 12 and to open the short-circuit line 30. Preferably, this 2/2 directional control valve 43 is switched with a time offset or in time-offset manner relative to the 2/2 directional control valve 18, in order to prevent leakage currents.

Figure 5:
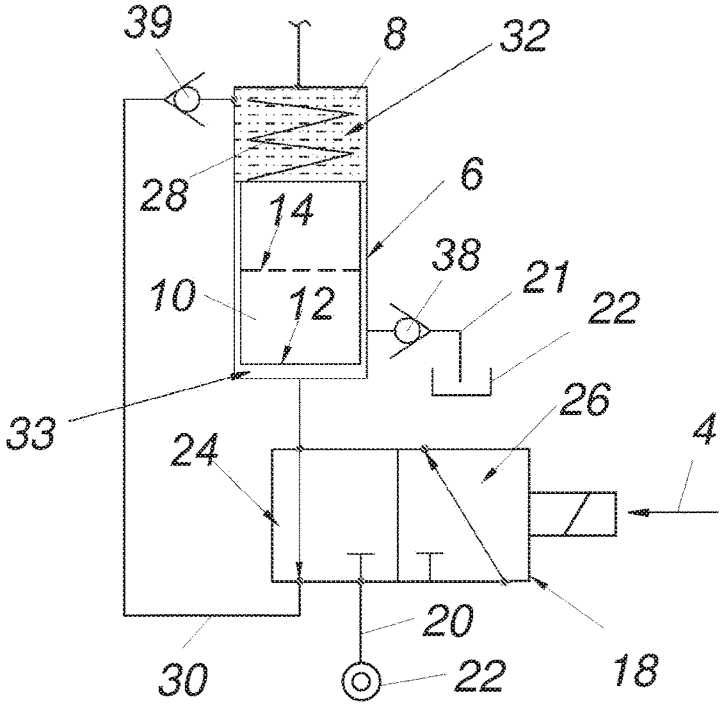

The circuit schematic relating to the displacer cylinder 6, shown in FIG. 5, allows particularly energy-saving operation of the displacer cylinder 6. Specifically, the directional control valve 18 does not continuously have to assume the second working position 26 for relocation of the piston element 10. In spite of the directional control valve 18 being switched back from the second working position 26 into the first working position 24, which takes place before the end position 14 of the piston element 10 is reached, hydraulic fluid can specifically be drawn in from the return line 21 of the pressure medium source 22, by way of the kickback valve 38, and in this way, the movement energy stored in the piston element 10 can be used for its remaining relocation into the end position 14.

The kickback valve 38 shuts off the cylinder chamber 33 for this purpose; this chamber is hydraulically connected with the pressure medium source 22 when the piston element 10 is relocated from the starting position into the end position 12, 14, hydraulically toward the return line 21 of the pressure medium source 22.

Resetting of the piston element 10 can take place, as is already known from FIG. 3, by way of the short-circuit line 30, with the directional control valve 18 in the first working position 24. A kickback valve 39 is assigned to the short-circuit line 30, in order to limit the functionality of the short-circuit line 30 on the relocation back of the piston element 10.

Figure 6:
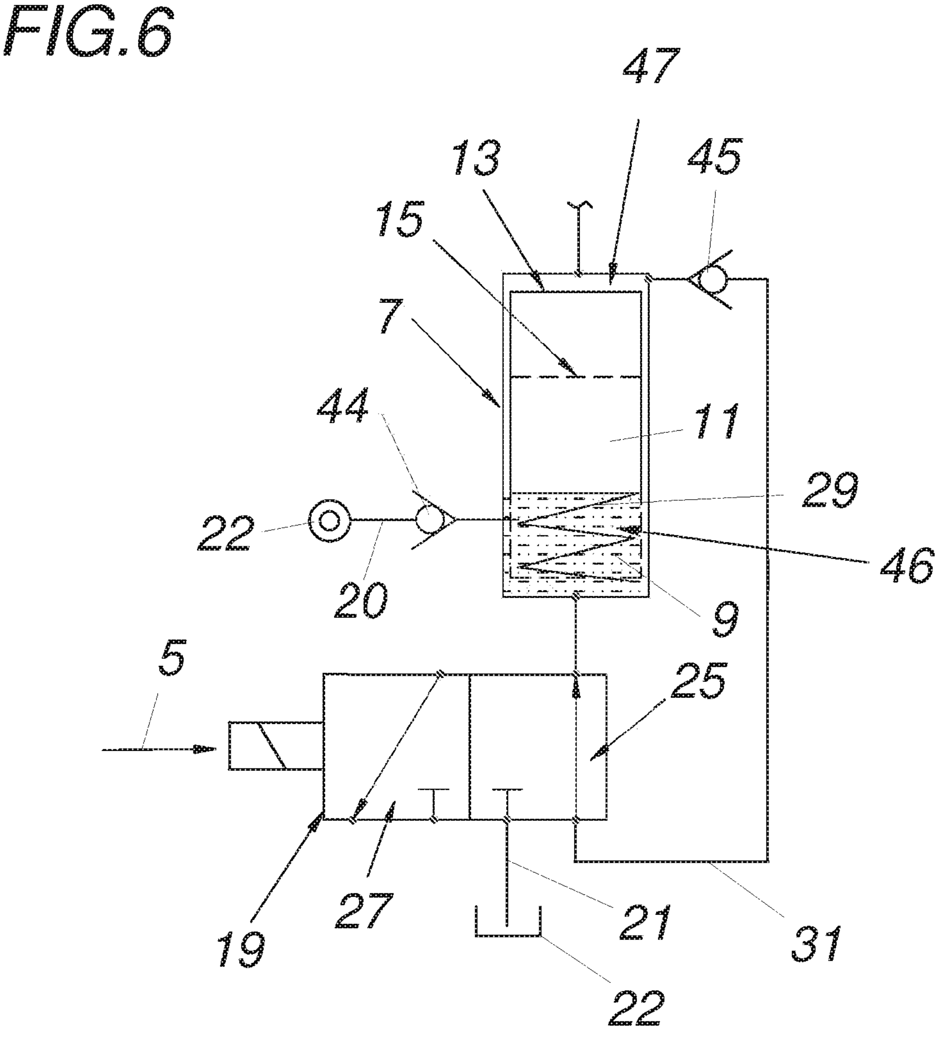

The displacer cylinder 7, which is complementary to the displacer cylinder 6, for discharging displacer volume 9, is shown according to FIG. 6; similar to the displacer cylinder 6, it allows particularly energy-saving operation. Specifically, the directional control valve 19 does not have to continuously assume the second working position 27 for relocation of the piston element 11. In spite of the directional control valve 19 being switched back from the second working position 27 into the first working position 25, which takes place before the end position 15 of the piston element 11 is reached, hydraulic fluid in the feed line 20 of the pressure medium source 22 can be pressed in, specifically by way of the kickback valve 44, and thereby the movement energy stored in the piston element 10 can be used for its remaining relocation into the end position 15.

For this purpose, the kickback valve 44 is hydraulically open from the cylinder chamber 46, which is hydraulically connected with the pressure medium source 22 when the piston element 11 is relocated from the starting position into the end position 13, 15, toward the feed line 20 of the pressure medium source 22.

Resetting of the piston element 11 can take place—as is already known from FIG. 1—by way of the short-circuit line 31, with the directional control valve 19 in the first working position 25. A kickback valve 45 is assigned to the short-circuit line 31, in order to limit the functionality of the short-circuit line 30 on the relocation back of the piston element 11.

Figure 7:
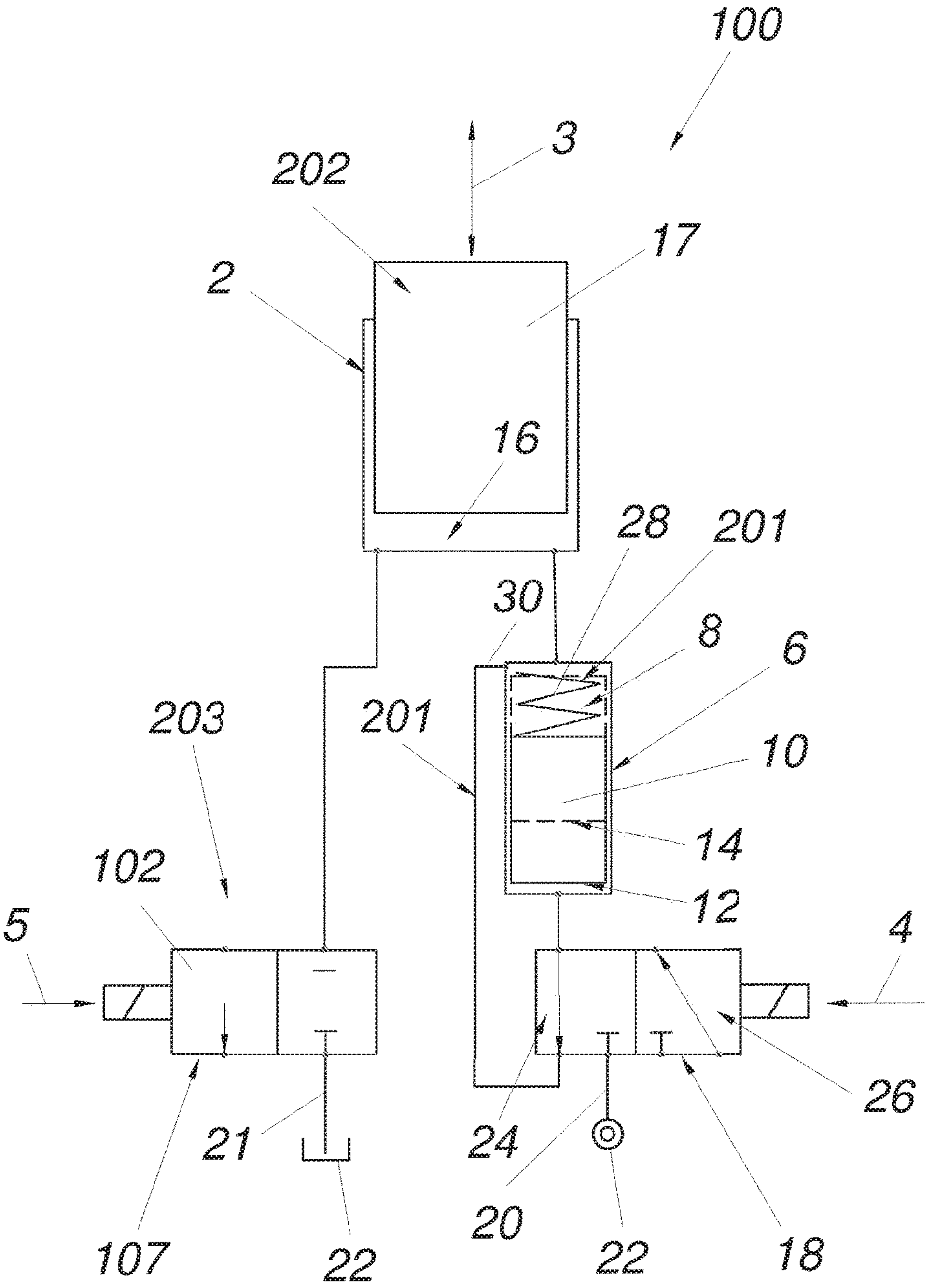

The hydraulic drive 100 shown in a schematic view according to FIG. 7 differs from the hydraulic drive 1 shown according to FIG. 1 in the resetting of the position output 3 or in the resetting device 203. Instead of a displacer cylinder 7, as in drive 1, here a shutoff valve 107 in the form of a 2/2 directional control valve 102 is provided. This directional control valve 102 connects the chamber volume 16 of the drive cylinder 2 with the pressure medium source 22, in accordance with an input signal 5, by way of the return line 20. In this way, the displacer volume 8 incrementally supplied to the drive cylinder 2 by way of the displacer cylinder 6 is discharged, and the position output 3 at the drive 100 is reset in simple manner, in terms of design.

It it should furthermore be mentioned that the embodiments shown in FIGS. 4 and 5 can, of course, also be used in drive 100.

As shown in FIG. 1, a sensor 48 is disposed in the chamber volume 16 of the drive cylinder 2, which sensor measures the hydraulic pressure here. These measurement data are used for error correction, in that influence is exerted on the discretely changed position output 3 at the drive 1—for example in that error resulting from a compressibility of the hydraulic pressure medium are evened out by way of these measurement data, and the position output 3 is changed in this regard. This can take place by way of changed input signals 4, 5, for example in that one or more switching processes for additional conveying of displacer volume 8 into or from the working cylinder 2 takes place, in addition to the input signal 4 shown in FIG. 2, in order to even out errors between the reference value and the actual value. In this way, a particularly precise position output 3 can be made possible.

The invention claimed is:

1. Method for discrete changing of a position output on a hydraulic drive, in which method at least one displacer cylinder incrementally either supplies to or discharges from the drive its displacer volume, as a function of at least one input signal, via relocation of its piston element from a starting position into an end position, wherein the piston element of the displacer cylinder is relocated multiple times from the starting position into the end position and from this end position back again, in order to discretely change the position output on the drive in accordance with the displacer volume supplied or discharged, wherein during relocation of the piston element from the starting position into the end position, the displacer cylinder is hydraulically connected with a feed line or return line of a pressure medium source, and in a subsequent step, the changed position output on the drive is reset again, wherein when the piston element is relocated from the end position into the starting position, cylinder chambers of the displacer cylinder are hydraulically short-circuited by way of a short-circuit line that is hydraulically separated from the feed line or return line of the pressure medium source.

2. Method according to claim 1, wherein a first displacer cylinder is used for incrementally supplying displacer volume, and a second displacer cylinder is used for incrementally discharging displacer volume.

3. Method according to claim 2, wherein one of the displacer cylinders resets the changed position output at the drive via incrementally supplying or discharging displacer volume.

4. Method according to claim 1, wherein during resetting of the changed position output on the drive, a shutoff valve is opened, which discharges or supplies its incrementally supplied or discharged displacer volume to the drive.

5. Method according to claim 1, wherein the displacer cylinder is hydraulically connected with the feed line and/or return line of the pressure medium source by way of a directional control valve.

6. Method according to claim 5, wherein the directional control valve changes from a first into a second working position as a function of the input signal, in order to hydraulically connect the feed line and/or return line of the pressure medium source connected with the directional control valve with the displacer cylinder.

7. Method according to claim 5, wherein the piston element of the displacer cylinder is relocated back into the starting position from the end position when the first working position of the directional control valve is assumed.

8. Method according to claim 5, wherein the cylinder chambers of the displacer cylinder are short-circuited by way of the directional control valve in the first working position.

9. Method according to claim 1, wherein the piston element is relocated back into its starting position via a spring element.

10. Method according to claim 1, wherein displacer volume is supplied to or discharged from a drive cylinder of the drive, in order to discretely change the position output at the drive by way of the movement of its piston element.

11. Method according to claim 1, wherein the hydraulic pressure in the drive cylinder is measured and used for error correction with regard to the discretely changed position output on the drive.

12. Method according to claim 11, wherein at least one input signal is changed as a function of the measured hydraulic pressure, in order to correct errors between a reference value and an actual value at the discretely changed position output.

13. Hydraulic drive, having a pressure medium source, having a drive that has a position output, having a displacer cylinder hydraulically connected with the drive, which has a piston element for supplying or discharging displacer volume to or from the drive, for a discrete change in the position output, as well as a device for relocation back of the piston element, having a first directional control valve that can be controlled as a function of an input signal, wherein by way of the first directional control valve the displacer cylinder is connected with the pressure medium source as a function of a working position of the first directional control valve, for multiple incremental supply or discharge of displacer volume, and having a reset device connected with the drive, for resetting the changed position output at the hydraulic drive, wherein the device for relocation back of the piston element has a short-circuit line between cylinder chambers of the displacer cylinder, which short-circuit line is hydraulically separated from the pressure medium source when the piston element is relocated back.

14. Hydraulic drive according to claim 13, wherein the device for relocation back of the piston element has a spring element that engages on the piston element.

15. Hydraulic drive according to claim 13, wherein the short-circuit line is hydraulically connected with the displacer cylinder by way of the first directional control valve, in its first working position, and wherein the displacer cylinder is hydraulically connected with the pressure medium source in a second working position of the first directional control valve.

16. Hydraulic drive according to claim 13, wherein the device for relocation back of the piston element has a second directional control valve, which, jointly with the first directional control valve is hydraulically connected with the displacer cylinder.

17. Hydraulic drive according to claim 13, wherein the reset device has a shutoff valve or a displacer cylinder.

18. Hydraulic drive according to claim 13, wherein the hydraulic drive has a kickback valve, that hydraulically blocks the cylinder chamber, which is hydraulically connected with the pressure medium source during relocation of the piston element from the starting position into the end position, toward the return line of the pressure medium source, and is hydraulically open toward the feed line of the pressure medium source.

19. Hydraulic drive according to claim 18, wherein the short-circuit line has a further directional control valve or a kickback valve.

* * * * *